US012668039B2

(12) United States Patent
Cho

(10) Patent No.: US 12,668,039 B2
(45) Date of Patent: Jun. 30, 2026

(54) WATERPROOF SOUND-TRANSMITTING SHEET AND METHOD FOR MANUFACTURING WATERPROOF SOUND-TRANSMITTING SHEET

(71) Applicant: AMOGREENTECH CO., LTD., Gimpo-si (KR)

(72) Inventor: Junkeun Cho, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 240 days.

(21) Appl. No.: 18/273,008

(22) PCT Filed: Jan. 18, 2022

(86) PCT No.: PCT/KR2022/000924
§ 371 (c)(1),
(2) Date: Jul. 18, 2023

(87) PCT Pub. No.: WO2022/158827
PCT Pub. Date: Jul. 28, 2022

(65) Prior Publication Data
US 2024/0116262 A1 Apr. 11, 2024

(30) Foreign Application Priority Data
Jan. 19, 2021 (KR) ........................ 10-2021-0007372

(51) Int. Cl.
*B32B 5/02* (2006.01)
*B32B 5/14* (2006.01)
(Continued)

(52) U.S. Cl.
CPC .............. *B32B 5/022* (2013.01); *B32B 5/145* (2013.01); *B32B 5/147* (2013.01); *B32B 5/266* (2021.05);
(Continued)

(58) Field of Classification Search
CPC .......... B32B 2305/026; B32B 2307/10; B32B 2307/7265; B32B 27/12; B32B 33/00;
(Continued)

(56) References Cited

U.S. PATENT DOCUMENTS

| 10,132,004 B2 | 11/2018 | Lee et al. |
| 11,529,788 B2 | 12/2022 | Seo |

(Continued)

FOREIGN PATENT DOCUMENTS

| CN | 109417658 A | 3/2019 |
| KR | 10-2013-0129104 A | 11/2013 |

(Continued)

OTHER PUBLICATIONS

Translation of WO-2019050128-A1, Baek et al., Mar. 14, 2019. (Year: 2019).*

(Continued)

*Primary Examiner* — Hai Vo
(74) *Attorney, Agent, or Firm* — Maschoff Brennan

(57) ABSTRACT

A waterproof sound-transmitting sheet is disclosed. The waterproof sound-transmitting sheet comprises: a waterproof sound-transmitting layer having a waterproofing function and configured to transmit a sound; a first adhesive layer attached to a first surface of the waterproof sound-transmitting layer; and a second adhesive layer attached to a second surface of the waterproof sound-transmitting layer, opposite to the first surface, wherein the waterproof sound-transmitting layer comprises: a pore-free layer having no pores; and a porous layer laminated on the pore-free layer and containing pores.

3 Claims, 5 Drawing Sheets

(51) Int. Cl.
   *B32B 5/26*         (2006.01)
   *B32B 33/00*      (2006.01)
   *C09J 7/35*       (2018.01)

(52) U.S. Cl.
   CPC ................. *B32B 33/00* (2013.01); *C09J 7/35*
      (2018.01); *B32B 2305/026* (2013.01); *B32B*
      *2307/10* (2013.01); *B32B 2307/7265* (2013.01)

(58) Field of Classification Search
   CPC ......... B32B 5/022; B32B 5/145; B32B 5/147;
           B32B 5/266; D04H 1/728; C09J 7/35
   See application file for complete search history.

(56)           References Cited

U.S. PATENT DOCUMENTS

| | | | |
|---|---|---|---|
| 2013/0156985 A1 | 6/2013 | Karube et al. | |
| 2015/0030797 A1 * | 1/2015 | Seo ........................... | B32B 5/26 |
| | | | 264/10 |
| 2018/0078673 A1 * | 3/2018 | Seo ......................... | A61L 27/50 |
| 2020/0100403 A1 * | 3/2020 | Seo ........................... | D01F 1/09 |
| 2021/0176550 A1 | 6/2021 | Sugaya et al. | |
| 2021/0292611 A1 * | 9/2021 | Higuchi ............... | B32B 29/005 |

FOREIGN PATENT DOCUMENTS

| | | | | | |
|---|---|---|---|---|---|
| KR | 10-2014-0018840 A | 2/2014 | | | |
| KR | 10-2018-0006046 A | 1/2018 | | | |
| KR | 10-2018-0044691 A | 5/2018 | | | |
| KR | 20180044691 A | * | 5/2018 | ............. | B32B 29/02 |
| KR | 10-2019-0065459 A | 6/2019 | | | |
| WO | WO-2018221336 A1 | * | 12/2018 | ........... | C09J 175/04 |
| WO | WO-2019050128 A1 | * | 3/2019 | ............. | D04H 1/593 |

OTHER PUBLICATIONS

Translation of KR 20180044691, In Yong Seo, May 3, 2018. (Year: 2018).*
CN Office Action dated Nov. 24, 2025 in application No. 202280010651.1.

* cited by examiner

WATERPROOF SOUND-TRANSMITTING SHEET AND METHOD FOR MANUFACTURING WATERPROOF SOUND-TRANSMITTING SHEET

TECHNICAL FIELD

The present disclosure relates to a waterproof sound-transmitting sheet and a method of manufacturing the waterproof sound-transmitting sheet, and more specifically, to a waterproof sound-transmitting sheet that is lightweight, has high waterproof performance, and has improved sound transmission efficiency, and a method of manufacturing the waterproof sound-transmitting sheet.

BACKGROUND ART

Recently, the use of mobile electronic devices such as a portable terminal, a digital camera, and a laptop is increasing day by day. Since these mobile electronic devices are used while being carried, the mobile electronic devices are required to have a waterproof function. However, a sound hole through which a sound is emitted is formed in a portion on which a speaker or a microphone is installed, and water or dust permeates into the electronic device through the sound hole.

Therefore, a waterproof sound-transmitting sheet for passing through a sound and blocking water or dust is installed in the sound hole. The waterproof sound-transmitting sheet should be manufactured in consideration of both waterproofness and sound transmission efficiency.

In relation to the waterproof sound-transmitting sheet, Korean Patent Application Laid-Open No. 10-2010-0041839 (Apr. 22, 2010) discloses a configuration formed of a polytetrafluoroethylene porous film. However, since the conventional waterproof sound-transmitting film is formed of only a polytetrafluoroethylene porous film, there is a problem that as the period of use thereof increases, sizes of micro-pores of the porous film gradually increase due to an external impact, sound pressure, etc., thereby degrading waterproof performance.

SUMMARY OF INVENTION

Technical Problem

The present disclosure is directed to providing a waterproof sound-transmitting sheet including a porous layer formed by electrospinning a solution containing a polymer material and a solvent, and a pore-free layer formed by dissolving the pore layer with the solvent remaining in a lower portion of the pore layer, and a method of manufacturing the waterproof sound-transmitting sheet.

In addition, the present disclosure is directed to providing a waterproof sound-transmitting sheet including a porous layer and a pore-free layer having a nano-web structure in which fibers and beads are mixed by electrospinning a solution containing a polymer material and a solvent, and a method of manufacturing the waterproof sound-transmitting sheet.

Solution to Problem

A waterproof sound-transmitting sheet according to embodiments of the present disclosure includes a waterproof sound-transmitting layer having a waterproofing function and configured to transmit a sound, a first adhesive layer attached to a first surface of the waterproof sound-transmitting layer, and a second adhesive layer attached to a second surface of the waterproof sound-transmitting layer, which is opposite to the first surface, wherein the waterproof sound-transmitting layer includes a pore-free layer having no pores and a porous layer laminated on the pore-free layer and including pores.

A method of manufacturing a waterproof sound-transmitting sheet according to embodiments of the present disclosure includes preparing a collecting support, preparing a spinning solution containing a polymer material and a solvent, forming a porous layer having a web structure in which fibers are laminated by intersecting each other by electrospinning the spinning solution on one surface of the collecting support, and forming a pore-free layer by dissolving a portion of the porous layer adjacent to the one surface of the collecting support with the solvent contained in the spun spinning solution.

Advantageous Effects of Invention

As the waterproof sound-transmitting sheet according to the embodiments of the present disclosure has the porous layer formed on the upper portion thereof and the pore-free layer formed on the lower portion thereof, the waterproof sound-transmitting sheet is lighter in weight and has better elasticity than the conventional waterproof sound-transmitting sheet formed of only the pore-free film.

As the waterproof sound-transmitting sheet according to the embodiments of the present disclosure has the porous layer formed on the upper portion thereof and the pore-free layer formed on the lower portion thereof, the waterproof sound-transmitting sheet is more effective in transmitting the sound through vibration and has more improved durability than the waterproof sound-transmitting layer formed of only the porous layer.

The waterproof sound-transmitting sheet according to the embodiments of the present disclosure includes the porous layer and the pore-free layer having the nano-web structure in which fibers and beads are mixed, thereby improving the elastic restoring force of the waterproof sound-transmitting sheet due to the connection structure between the beads and the fibers of the waterproof sound-transmitting sheet to be restored to the original shape even after being exposed to the high-pressure environment for a long time, thereby preventing sound characteristics from deteriorating.

DESCRIPTION OF EMBODIMENTS

Figure 1:
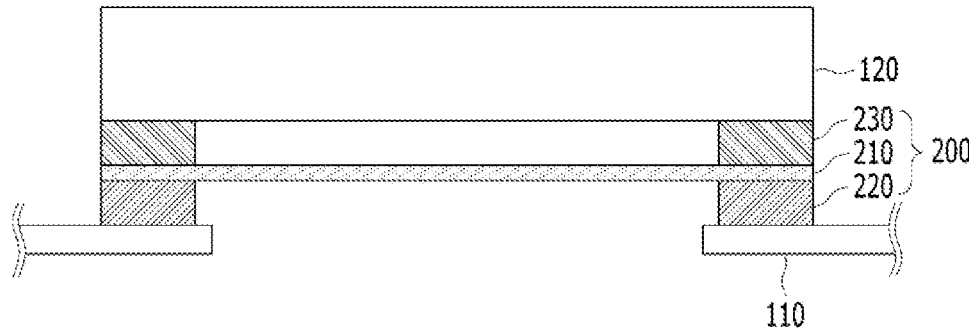
FIG. 1 is a view illustrating a state of a waterproof sound-transmitting sheet and an electronic device to which the waterproof sound-transmitting sheet is attached according to embodiments of the present disclosure.

Hereinafter, the most preferred embodiment of the present disclosure will be described with reference to the accompanying drawings in order to describe the present disclosure in detail to the extent that those skilled in the art can easily carry out the technical spirit of the present disclosure. First, in adding reference numerals to components in each drawing, it should be noted that the same components have the same reference numerals as much as possible even when they are shown in different drawings. In addition, in describing embodiments of the present disclosure, when it is determined that the detailed description of related known configurations or functions may obscure the gist of the present disclosure, a detailed description thereof will be omitted.

FIG. 1 is a view illustrating a state of a waterproof sound-transmitting sheet and an electronic device to which the waterproof sound-transmitting sheet is attached according to embodiments of the present disclosure. Referring to FIG. 1, a waterproof sound-transmitting sheet 200 may be attached to an inside of an electronic device 110 to function to transmit a sound between the inside and an outside of the electronic device 110 while preventing liquid or foreign substances introduced from the outside of the electronic device 110 from flowing into the electronic device 110.

A first surface of the waterproof sound-transmitting sheet 200 may be attached to an inside of a housing (or a case) of the electronic device 110, and a second surface positioned opposite to the first surface of the waterproof sound-transmitting sheet 200 may be attached to an element 120 inside the electronic device 110.

According to embodiments, the element 120 may be a sound module 120 such as a speaker module or a microphone module, but is not limited thereto. The sound module 120 may include a sound element and a circuit board on which the sound element is mounted.

According to the embodiments, the waterproof sound-transmitting sheet 200 may include a waterproof sound-transmitting layer 210 having a waterproof or dustproof function and configured to transmit a sound, a first adhesive layer 220 attached to a first surface of the waterproof sound-transmitting layer 210 and configured to be attached to the electronic device 110, and a second adhesive layer 230 attached to a second surface positioned opposite to the first surface of the waterproof sound-transmitting layer 210 and configured to be attached to the sound module.

Therefore, the waterproof sound-transmitting sheet 200 may prevent liquid or foreign substances introduced from the outside of the electronic device 110 from flowing into the sound module 120. In addition, the waterproof sound-transmitting sheet 200 may transmit the sound generated by the speaker module to the outside (e.g., the user) of the electronic device 110 or transmit the sound generated from the outside to the microphone module.

Meanwhile, when an external pressure of the electronic device 110 increases, an internal pressure between the waterproof sound-transmitting sheet 200 and the sound module 120 may increase. When the internal pressure continuously increases, a pressure applied to the waterproof sound-transmitting sheet 200 increases, and thus the waterproof sound-transmitting sheet 200 may stretch. The waterproof sound-transmitting sheet 200 according to the embodiments of the present disclosure may not only have pressure resistance that is not broken even in a high-pressure environment of 10 bar or higher, but also return to an original shape even when the high-pressure environment is removed.

Figure 2:
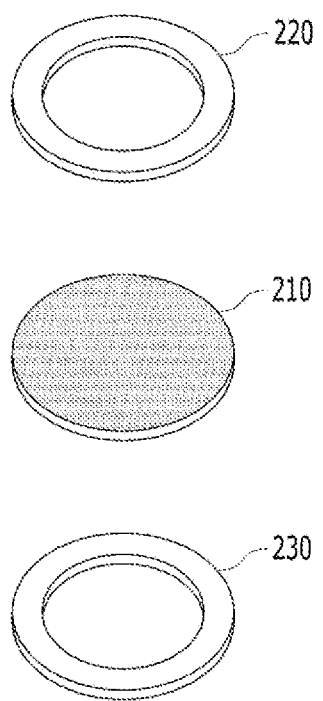
FIG. 2 is an exploded perspective view of the waterproof sound-transmitting sheet according to the embodiments of the present disclosure.

FIG. 2 is an exploded perspective view of the waterproof sound-transmitting sheet according to the embodiments of the present disclosure. Referring to FIG. 2, the waterproof sound-transmitting sheet 200 may be formed in a form in which the waterproof sound-transmitting layer 210, the first adhesive layer 220, and the second adhesive layer 230 are bonded.

The waterproof sound-transmitting layer 210 may be formed of a thin film having a predetermined shape. According to the embodiments, the waterproof sound-transmitting layer 210 may be a thin film having various shapes such as circular, elliptical, and polygonal shapes.

The waterproof sound-transmitting layer 210 may be a thin film having a thickness of about 5 μm to 100 μm depending on sound-permeability and waterproof performance required by an applied device, but is not limited thereto, and according to the embodiments, the waterproof sound-transmitting layer 210 may also be formed in a thickness of 5 μm or less or 100 μm or more in consideration of a thickness of the applied electronic device.

The waterproof sound-transmitting layer 210 may be made of a highly elastic (high elasticity) and pore-free material in order to provide waterproof performance under high water pressure. For example, the waterproof sound-transmitting layer 210 may be made of a highly elastic material such as latex, polyurethane (PU), or thermoplastic polyurethane (TPU).

The waterproof sound-transmitting layer 210 according to the embodiments of the present disclosure may include a pore-free membrane formed through electrospinning to provide waterproof performance under high water pressure. For example, the waterproof sound-transmitting layer 210 may be manufactured by electrospinning a polymer material to form a polymer material layer having a web structure. In particular, the waterproof sound-transmitting layer 210 according to the embodiments of the present disclosure may be formed by electrospinning a solution containing a polymer material and a solvent so that at least a part of the polymer material layer having the web structure is dissolved by the solvent to form the pore-free layer.

In this case, the polymer material may include aromatic polyesters such as polyamide, polyimide, polyamideimide, poly(meta-phenylene isophthalamide), poly sulfone, polyether ketone, polyether imide, polyethylene terephthalate, polytrimethylene terephthalate, polyethylene naphthalate, polyphosphazenes such as polytetrafluoroethylene, polydiphenoxyphosphazenes, and poly{bis[2-(2-methoxy-ethoxy)phosphazenes]}, polyurethane copolymers including polyurethanes and polyethers urethane, cellulose acetate, cellulose acetate butyrate, cellulose acetate propionate, etc. In addition, the polymer material may include polyvinylidene fluoride (PVDF), poly(vinylidene fluoride-co-hexafluoropropylene), perfluoropolymer, polyvinyl chloride or polyvinylidene chloride and copolymers thereof, polyethylene glycol dialkyl ether and polyethylene glycol derivatives including polyethylene glycol dialkyl esters, polyoxides including poly(oxymethylene-oligo-oxyethylene), polyethylene oxide, and polypropylene oxide, polyvinylac-etate, poly(vinylpyrrolidone-vinyl acetate), polystyrene and polystyrene acrylonitrile copolymers, polyacrylonitrile, polyacrylonitrile copolymers including polyacrylonitrile methyl methacrylate copolymers, polymethyl methacrylate, polymethyl methacrylate copolymers polymers, and mix-tures thereof.

When the waterproof sound-transmitting layer 210 is formed using an electrospinning process, a thickness of the waterproof sound-transmitting layer 210 may be easily adjusted, and the waterproof sound-transmitting layer 210 having a small thickness may be easily manufactured. In particular, when the waterproof sound-transmitting layer 210 includes a pore-free layer, as the thickness of the waterproof sound-transmitting layer 210 is smaller, sound vibrations on one side surface may be more effectively transmitted to the other side surface, and thus when the electrospinning process is used, the thickness of the water-proof sound-transmitting layer 210 may be formed as small as possible, thereby more increasing a sound-transmission property.

The waterproof sound-transmitting layer 210 according to the embodiments of the present disclosure may include the pore-free layer and have higher waterproofness than the waterproof sound-transmitting layer including only the porous layer. In particular, when the waterproof sound-transmitting layer is formed of only the porous layer, cracks occur in the waterproof sound-transmitting layer due to the expansion of a plurality of pores when a high pressure is applied to the waterproof sound-transmitting layer, and thus waterproof performance is highly likely to be reduced. On the other hand, the waterproof sound-transmitting layer according to the present disclosure may include the pore-free layer and may not be damaged or deformed even at a pressure of 5 bar, preferably, 10 bar or higher.

The first adhesive layer 220 is formed of a thin film having a predetermined shape with an opening therein. For example, the first adhesive layer 220 is formed of a thin film having various shapes such as circular, elliptical, and polygonal shapes along the waterproof sound-transmitting layer 210. In this case, the first adhesive layer 220 may include an opening for sound transmission. For example, the first adhesive layer 220 may have a ring shape having an opening at the center, but the embodiments of the present disclosure are not limited thereto.

The first adhesive layer 220 may be bonded to the first surface (e.g., the lower surface) of the waterproof sound-transmitting layer 210. According to the embodiments, the first surface (e.g., the lower surface) of the first adhesive layer 220 may be attached to the electronic device 110, and the second surface (e.g., the upper surface) opposite to the first surface of the first adhesive layer 220 may be adhered to the first surface (e.g., the lower surface) of the waterproof sound-transmitting layer 210.

According to the embodiments, the first adhesive layer 220 may be attached to a region in which the sound hole formed in the electronic device 110 is formed.

The first adhesive layer 220 may be formed by bonding a thin film having an adhesive surface formed on a single surface and a hot melt formed of a thermoplastic resin in the form of a pellet or a film. For example, the first adhesive layer 220 may also be formed by laminating the hot melt and the single-sided adhesive film.

The second adhesive layer 230 is formed of a thin film having a predetermined shape with an opening therein. For example, the second adhesive layer 230 is formed of a thin film having various shapes such as circular, elliptical, and polygonal shapes along the waterproof sound-transmitting layer 210. In this case, the second adhesive layer 230 may include an opening for sound transmission. For example, the second adhesive layer 230 may have a ring shape having an opening at the center, but the embodiments of the present disclosure are not limited thereto.

The second adhesive layer 230 may be bonded to the second surface (e.g., the upper surface) of the waterproof sound-transmitting layer 210. According to the embodi-ments, the first surface (e.g., the lower surface) of the second adhesive layer 230 may be attached to the sound module 120, and the second surface (e.g., the lower surface) oppo-site to the first surface of the second adhesive layer 230 may be adhered to the second surface (e.g., the lower surface) of the waterproof sound-transmitting layer 210.

According to the embodiments, the second adhesive layer 230 may be attached to a region of the sound module 120 in which a sound is input and output.

The second adhesive layer 230 may also be formed by bonding a thin film having an adhesive surface formed on a single surface and a hot melt formed of a thermoplastic resin in the form of a pellet or a film. For example, the second adhesive layer 230 may also be formed by laminating the hot melt and the single-sided adhesive film.

Figure 3:
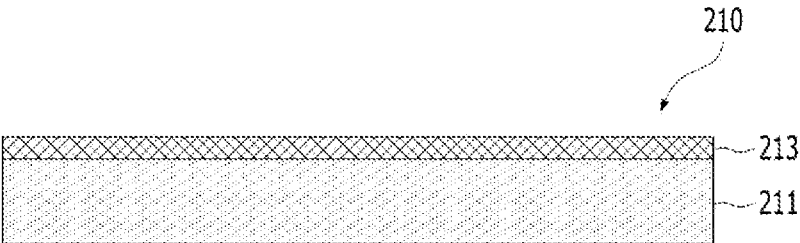
FIG. 3 is a view illustrating a waterproof sound-transmitting layer according to the embodiments of the present disclosure.

FIG. 3 is a view illustrating a waterproof sound-transmit-ting layer according to the embodiments of the present disclosure. Referring to FIG. 3, the waterproof sound-transmitting layer 210 may include a pore-free layer 211 and a porous layer 213.

The pore-free layer 211 may be a polymer material layer that does not contain pores. According to the embodiments, the pore-free layer 211 may have a structure in which pores are removed by dissolving and bonding (and aggregating) the laminated polymer material layers having the nano-web structure formed through the electrospinning method with the solvent.

The porous layer 213 may include laminated polymer material layers having the nano-web structure formed through the electrospinning method. According to the embodiments, the porous layer 213 may have a porous nano-web structure in which a plurality of microfiber strands are alternately laminated. In the specification, the nano-web structure refers to a structure in which microfiber strands having a diameter of tens of nanometers to thousands of nanometers are laminated by intersecting each other, but the embodiments of the present disclosure are not limited thereto.

The pore-free layer 211 may constitute a lower layer of the waterproof sound-transmitting layer 210, and the porous layer 213 may constitute an upper layer of the waterproof sound-transmitting layer 210. According to the embodi-ments, a ratio of a thickness of the pore-free layer 211 to the entire thickness of the waterproof sound-transmitting layer 210 may be 50 to 95%, preferably, 80 to 90%.

Since the waterproof sound-transmitting layer 210 according to the embodiments of the present disclosure includes the pore-free layer 211 disposed on the lower layer thereof and the porous layer 213 disposed on the upper layer thereof, the waterproof sound-transmitting sheet has a lighter in weight and better elasticity than the waterproof sound-transmitting layer formed of only the pore-free layer, and is more effective in transmitting the sound through vibration and has more improved durability than the water-proof sound-transmitting layer formed of only the porous layer.

Figure 4:
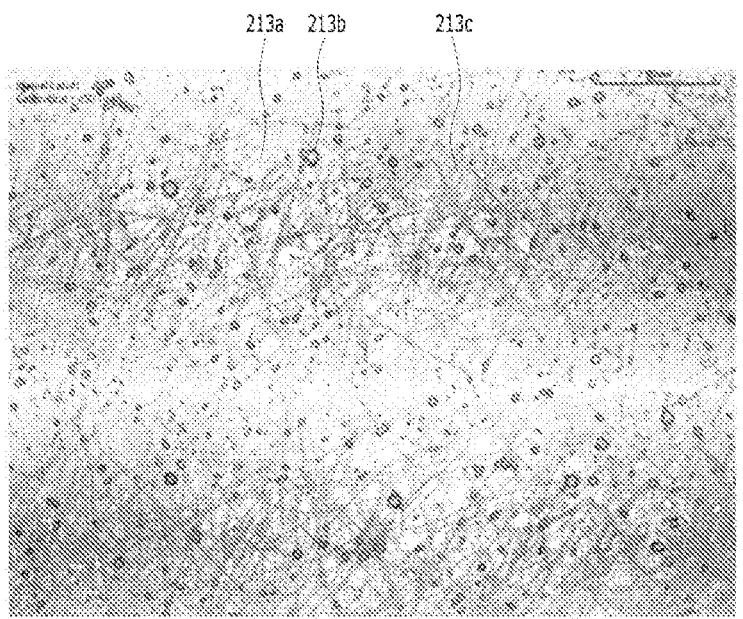
FIGS. 4 and 5 are views illustrating an upper surface of the waterproof sound-transmitting layer according to the embodiments of the present disclosure.
Figure 5:
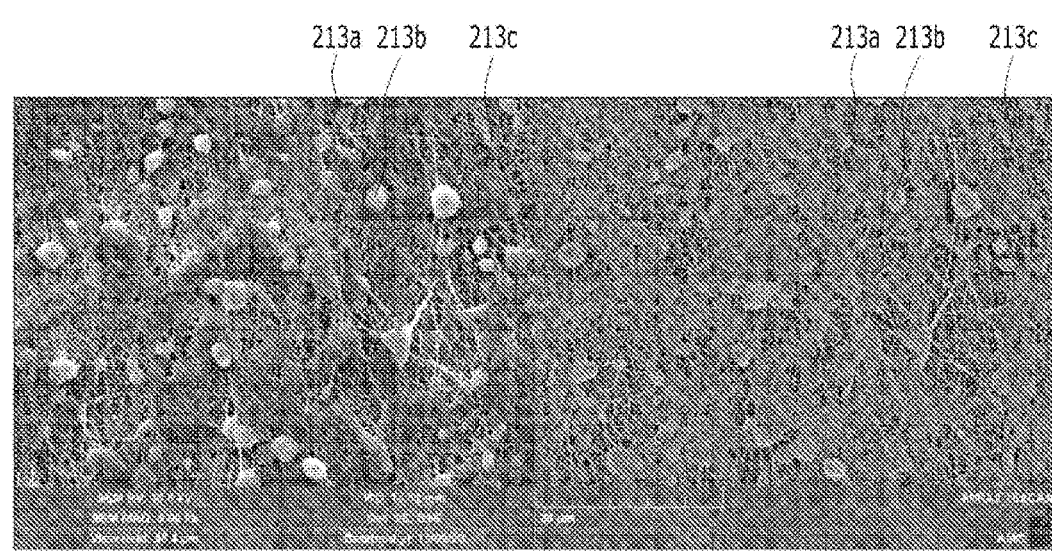

FIGS. 4 and 5 are views illustrating an upper surface of the waterproof sound-transmitting layer according to the embodiments of the present disclosure. Referring to FIGS. 4 and 5, the upper surface of the waterproof sound-transmitting layer 210, that is, the upper surface of the porous layer 213 is illustrated.

FIG. 4 is a scanning electron microscope (SEM) picture captured in a secondary electron (SE) mode, and FIG. 5 is an SEM picture captured in a back scattered electron (BSE) mode.

The porous layer 213 may include fibers 213a, beads 213b, and pores 213c.

The fiber 213a may be a polymer fiber formed by electrospinning an electrospinning solution containing a polymer material. When the electrospinning solution is electrospun, the solvent contained in the solution is volatilized, and microfibers 213a are formed as the polymer materials stretch.

The porous layer 213 includes a plurality of fibers 213a having different thicknesses and lengths, and the plurality of fibers 213a may intersect each other to form a web structure. For example, a thickness (or a diameter) of the fiber 213a may be 50 to 500 nm, preferably, 70 to 250 nm, but the embodiments of the present disclosure are not limited thereto.

The bead 213b may be a polymer material in the form of a lump disposed on the porous layer 213. The bead 213b may be a lump of polymer material formed by entangling or aggregating polymer fibers formed by electrospinning. For example, a thickness (or a diameter) of the bead 213b may be 0.3 to 5 μm, preferably, 0.8 to 3 μm, but the embodiments of the present disclosure are not limited thereto.

A larger number of beads 213b may be formed as a flow rate of the electrospinning solution increases during electrospinning, the humidity of a surrounding environment increases, and a voltage applied during electrospinning increases, but the embodiments of the present disclosure are not limited thereto.

According to the embodiments, the beads 213b may be formed at both ends of the fiber 213a, but are not limited thereto, and may be formed at insides of both ends of the fiber 213a.

The pore 213c is a passage or a hole through which air may pass and may be formed in the porous layer 213. According to the embodiments, the pore 213c may be a gap or space generated by the fibers 213a laminated by intersecting each other.

A ratio of the fibers 213a and the beads 213b in the porous layer 213 may be 3:7 to 7:3. In the specification, the ratio of the fibers 213a and the beads 213b may be a ratio of areas of the fibers 213a and areas of the beads 213b to a total area of the porous layer 213 or a ratio of weights of the fibers 213a and weights of the beads 213b to a total weight of the porous layer 213.

As the ratio of the fibers 213a to the beads 213b increases, the elongation of the waterproof sound-transmitting layer 210 improves, and thus the sound transmission performance improves, but the pressure resistance (resilience) may deteriorate. Conversely, as the ratio of the fibers 213a to the beads 213b decreases, the sound transmission performance of the waterproof sound-transmitting layer 210 decreases, but the pressure resistance may improve.

Since the waterproof sound-transmitting layer 210 according to the embodiments of the present disclosure includes the pore-free layer 211 and the porous layer 213, the waterproof sound-transmitting layer 210 may be light and may have good elasticity, may be effective in sound transmission, and may have good durability at high pressure. Furthermore, by including the fibers 213a and the beads

213b in the porous layer 213 at an appropriate ratio in consideration of both the sound transmission performance and the pressure resistance, both the sound transmission performance and the pressure resistance may be good.

In particular, the fibers 213a and the beads 213b of the porous layer 213 may be connected, and elastic forces of the fibers 213a may be limited by the beads 213b. Therefore, it is possible to increase the elastic restoring force of the waterproof sound-transmitting layer 210. For example, even when the waterproof sound-transmitting layer 210 is stretched by high pressure, the waterproof sound-transmitting layer 210 may return to its original shape when the high pressure is removed. Therefore, the sound characteristics of the waterproof sound-transmitting sheet 200 may not deteriorate.

FIGS. 6 to 9 are views for describing a method of manufacturing the waterproof sound-transmitting layer according to the embodiments of the present disclosure.

Figure 6:
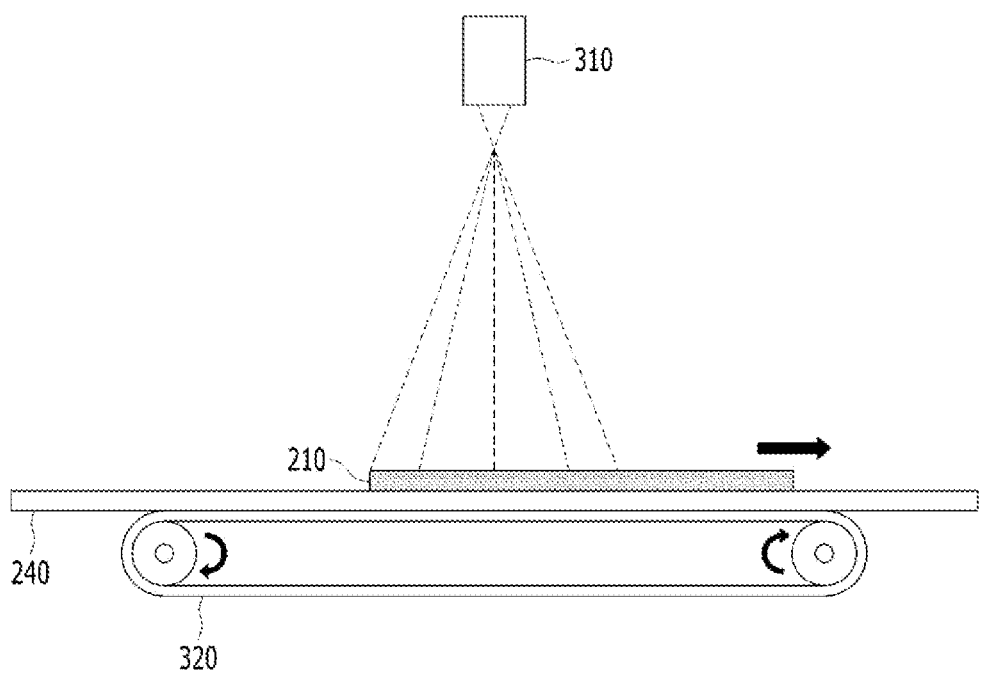
FIGS. 6 to 9 are views for describing a method of manufacturing the waterproof sound-transmitting layer according to the embodiments of the present disclosure.

Referring to FIG. 6, the waterproof sound-transmitting layer 210 may be manufactured by the electrospinning method. According to the embodiments, the waterproof sound-transmitting layer 210 may be formed by spinning an electrospinning solution to a collector 320 through a spinning nozzle 310.

The spinning nozzle 310 may be a device for electrospinning nanofibers using the electrospinning solution. According to the embodiments, the spinning nozzle 310 may have a hole through which the electrospinning solution flows, the hole may be exposed to an end of the spinning nozzle 310, and the electrospinning solution flowing through the hole may be discharged from the end of the spinning nozzle 310 and spun as nanofibers.

The electrospinning solution may include a polymer material and a solvent. That is, the electrospinning solution may be a solution in which the polymer material is dissolved by the solvent.

The collector 320 may be disposed on a lower portion spaced apart from the spinning nozzle 310. The collector 320 may be grounded, and thus fibers generated by the charged spinning solution may be accumulated. That is, a voltage may be applied to the spinning solution flowing into the hole of the spinning nozzle 310 to charge the spinning solution, and the charged spinning solution may be discharged to the outside of the spinning nozzle 310 in the form of the nanofiber and accumulated in the grounded collector 320, and thus the waterproof sound-transmitting layer 210 may be formed.

According to the embodiments, the collector 320 may be implemented in the form of an electric conductor, for example, a metal plate or a rotating conveyor belt. In this case, a collecting support 240 on which the waterproof sound-transmitting layer 210 is collected may be provided on the collector 320. That is, the waterproof sound-transmitting layer 210 is formed as fibers are accumulated in the collecting support 240 disposed on the collector 320.

The collecting support 240 may be transported on the collector 320.

According to the embodiments, the collecting support 240 is formed of a film-type pore-free member. For example, the collecting support may be one of release paper, art paper, coated paper, and glossy paper. For example, a pore-free waterproof film may be coated on a surface of the collecting support 240 on which the waterproof sound-transmitting layer 210 is formed.

Figure 7:
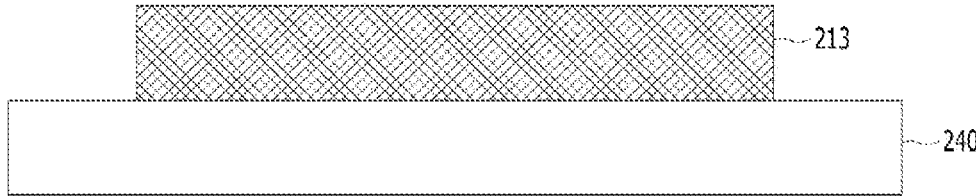

Referring to FIG. 7, the porous layer 213 is formed by electrospinning the electrospinning solution through the spinning nozzle 310. According to the embodiments, as the electrospinning solution containing the polymer material and the solvent is discharged through the spinning nozzle 310, the polymer material included in the electrospinning solution is laminated on the collecting support 240 in the form of fibers, and thus the porous layer 213 is formed on the collecting support 240. In this case, the solvent included in the electrospinning solution may also be spun on the collecting support 240 together.

According to the embodiments, a magnitude of the voltage applied to the spinning nozzle 310 may be 95 to 105 kV, a distance between the collector 320 and a tip of the spinning nozzle 310 may be 190 to 220, and a flow rate of the electrospinning solution spun through the spinning nozzle 310 may be 15 to 30 µl/min/hole.

The porous layer 213 may be formed in the form of a film on one surface of the collecting support 240. According to the embodiments, the porous layer 213 may be a porous nanoweb in which a plurality of microfibers are laminated by intersecting each other. For example, the porous layer 213 may be a waterproof layer.

As described above with reference to FIGS. 4 and 5, the porous layer 213 may include the fibers 213a, the beads 213b, and the pores 213c.

The polymer material included in the electrospinning solution may include a thermoplastic elastomer or polyvinylidene fluoride (PVDF). According to the embodiments, the thermoplastic elastomer may be thermoplastic polyurethanes (TPU).

According to the embodiments of the present disclosure, a weight ratio of PVDF in the polymer material may be up to 20 wt %. For example, when the polymer material includes TPU or PVDF, a weight ratio of TPU and PVDF may be 100:0 to 80:20. The PVDF as a hydrophobic material is advantageous in forming the waterproof sound-transmitting sheet, but when a content thereof exceeds 20 wt %, it is difficult to form a pore-free type sheet and a restoring force for restoring the waterproof sound-transmitting sheet upon deformed by an external force is weak, resulting in poor sound characteristics due to the weak restoring force, and thus it is important to form the electrospinning solution at an appropriate weight ratio of PVDF.

According to the embodiments, the viscosity of the electrospinning solution may be 100 to 400 cp, preferably, 180 to 250 cp. As described above, the waterproof sound-transmitting layer 210 according to the embodiments of the present disclosure may include the fibers 213a and the beads 213b at an appropriate ratio in consideration of both the sound transmission performance and the pressure resistance. Since the ratio between the fibers 213a and the beads 213b may be determined according to the viscosity of the electrospinning solution, the determination of the viscosity is important. When the viscosity of the electrospinning solution is 500 cp or more, the ratio of the beads 213b is reduced (e.g., smaller than a predetermined reference value), and when the viscosity of the electrospinning solution is 100 cp or less, the ratio of the fibers 213a may be reduced (e.g., smaller than a predetermined reference value).

According to the embodiments, a temperature of an environment in which electrospinning is performed may be 24 to 36° C., preferably, 28 to 34° C. According to the embodiments, humidity of the environment in which electrospinning is performed may be 30 to 75%, preferably, 45 to 60%.

Figure 8:
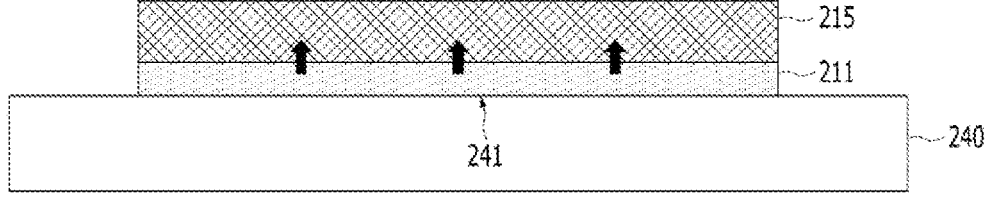
Figure 9:
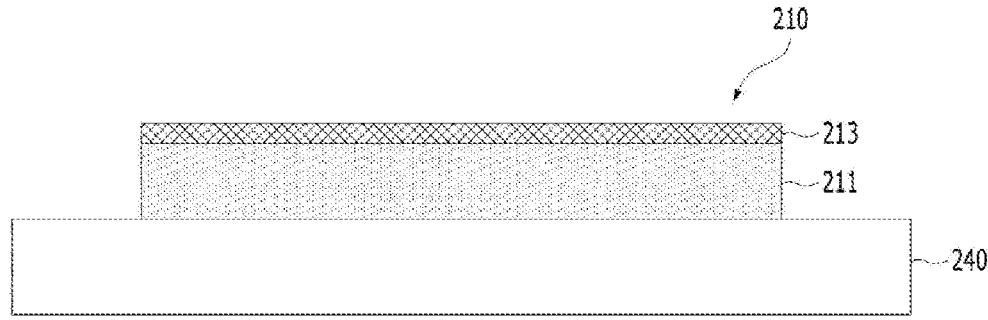

Referring to FIG. 8, a pore-free layer 217 is formed on a part of the porous layer 213. According to the embodiments, the pore-free layer 217 may be formed from a portion of the porous layer 213 adjacent to the collecting support 240.

As described above, a surface 241 of the collecting support 240 on which the waterproof sound-transmitting layer 210 is formed may be coated with a pore-free waterproof film. When the electrospinning solution containing the polymer material and the solvent is discharged through the spinning nozzle 310, the polymer material is laminated on the collecting support 240 in the form of fibers, and the solvent is also laminated on the collecting support 240.

In this case, most of the solvent discharged on the collecting support 240 is generally vaporized into the air, but some of the solvent that is not vaporized may be accumulated on the collecting support 240 (i.e., a lower layer of the porous layer 213). Therefore, a part of the porous layer 213 (i.e., a portion adjacent to the one surface 241 of the collecting support 240) may be in contact with the solvent, and the fibers forming the porous layer 213 may be dissolved by the solvent. As a result, the fibers laminated by intersecting each other are entangled, and pores formed between the fibers may be blocked, and as a result, the pore-free layer 217 may be formed on a portion (lower surface) of the porous layer 213.

In particular, according to the embodiments of the present disclosure, since the one surface 241 of the collecting support 240 is coated with the waterproof film, it is possible to suppress the evaporation of the solvent spun on the collecting support 240, thereby further facilitating the formation of the pore-free layer 211.

Furthermore, according to the embodiments of the present disclosure, the porous layer 213 includes the fibers 213a and the beads 213b. As the beads 213b are dissolved by the solvent, since the beads 213b become entangled with a plurality of fibers 213a positioned adjacent to the beads 213b, it is possible to further facilitate the formation of the pore-free layer 211 as compared to a porous layer formed of only fibers. In addition, as the beads 213b are dissolved by the solvent, since the beads 213b effectively block the pores 213c formed between the fibers 213a, it is possible to further facilitate the formation of the pore-free layer 211 as compared to the porous layer formed of only fibers.

Through the above process, a part of the porous layer 213 is formed as the pore-free layer 211 by the solvent.

Referring to FIG. 8, the lower surface of the porous layer 213 may be dissolved by the solvent and formed as the pore-free layer 211, and the pore-free layer 211 may be formed up to a predetermined thickness.

A thickness of the pore-free layer 211 may be adjusted by adjusting the evaporation of the solvent. According to the embodiments, the thickness of the pore-free layer 211 may vary depending on a flow rate or flow velocity of the electrospinning solution to be spun and also vary depending on a moving speed of the collecting support 240. For example, a ratio between the thickness of the pore-free layer 211 and the thickness of the porous layer 213 may be 1:1 to 1:19, preferably, 1:4 to 1:9.

After the pore-free layer 211 is formed in the predetermined thickness, when all of the solvent spun on the collecting support 240 evaporates, the dissolution of the porous layer 213 by the solvent may be stopped. Therefore, the waterproof sound-transmitting layer 210 including the pore-free layer 211 and the porous layer 213 disposed on the pore-free layer 211 may be formed. That is, an upper layer of the waterproof sound-transmitting layer 210 becomes the porous layer 213 having the web structure, and a lower layer of the waterproof sound-transmitting layer 210 is coupled by fibers dissolved by the solvent to become the pore-free layer 211 from which the pores in the web structure are removed.

Since the waterproof sound-transmitting layer 210 according to the embodiments of the present disclosure includes the pore-free layer 211 disposed on the lower layer thereof and the porous layer 213 disposed on the upper layer thereof, the waterproof sound-transmitting sheet has a lighter in weight and better elasticity than the waterproof sound-transmitting layer formed of only the pore-free layer, and is more effective in transmitting the sound through vibration and has more improved durability than the waterproof sound-transmitting layer formed of only the porous layer.

Figure 10:
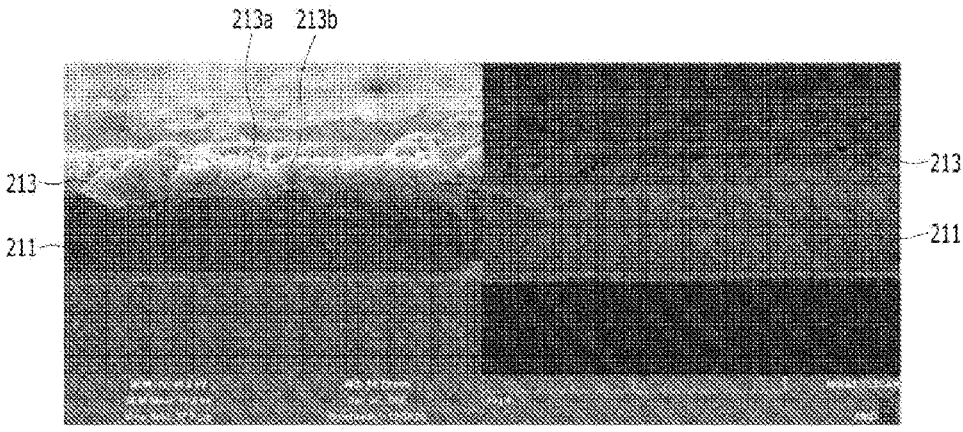
FIG. 10 is a cross-sectional view of the waterproof sound-transmitting layer according to the embodiments of the present disclosure.

FIG. 10 is a cross-sectional view of the waterproof sound-transmitting layer according to the embodiments of the present disclosure. Referring to FIG. 10, the waterproof sound-transmitting layer 210 may include the pore-free layer 211 and the porous layer 213 disposed on the pore-free layer 211.

As described above, the porous layer 213 may include the fibers 213*a* having the web structure made of the polymer material and the beads 213*b* made of the polymer material and having a lump shape.

The pore-free layer 211 may be formed by blocking the pores 213*c* in the porous layer 213 by the fibers 213*a* and the beads 213*b* entangled (or coupled) as the porous layer 213 is dissolved by the solvent spun together with the polymer material during electrospinning.

Figure 11:
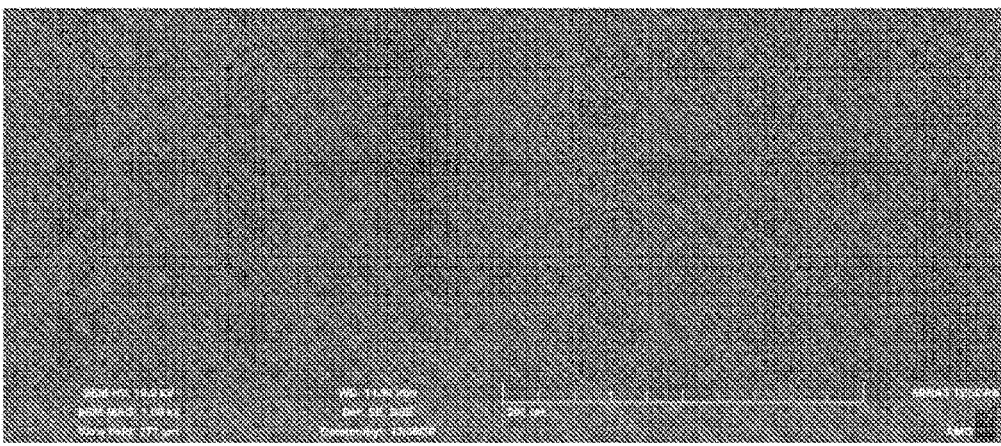
FIG. 11 is a view illustrating a lower surface of the waterproof sound-transmitting layer according to the embodiments of the present disclosure.

FIG. 11 is a view illustrating a lower surface of the waterproof sound-transmitting layer according to the embodiments of the present disclosure. Referring to FIG. 11, the lower surface of the waterproof sound-transmitting layer 210, that is, the lower surface of the pore-free layer 211 may appear.

As described above, the pore-free layer 211 is formed by blocking the pores 213*c* in the porous layer 213 as the porous layer 213 is dissolved by the solvent spun together with the polymer material during electrospinning. Therefore, as illustrated in FIG. 11, the lower surface of the waterproof sound-transmitting layer 210 does not have pores.

Figure 12:
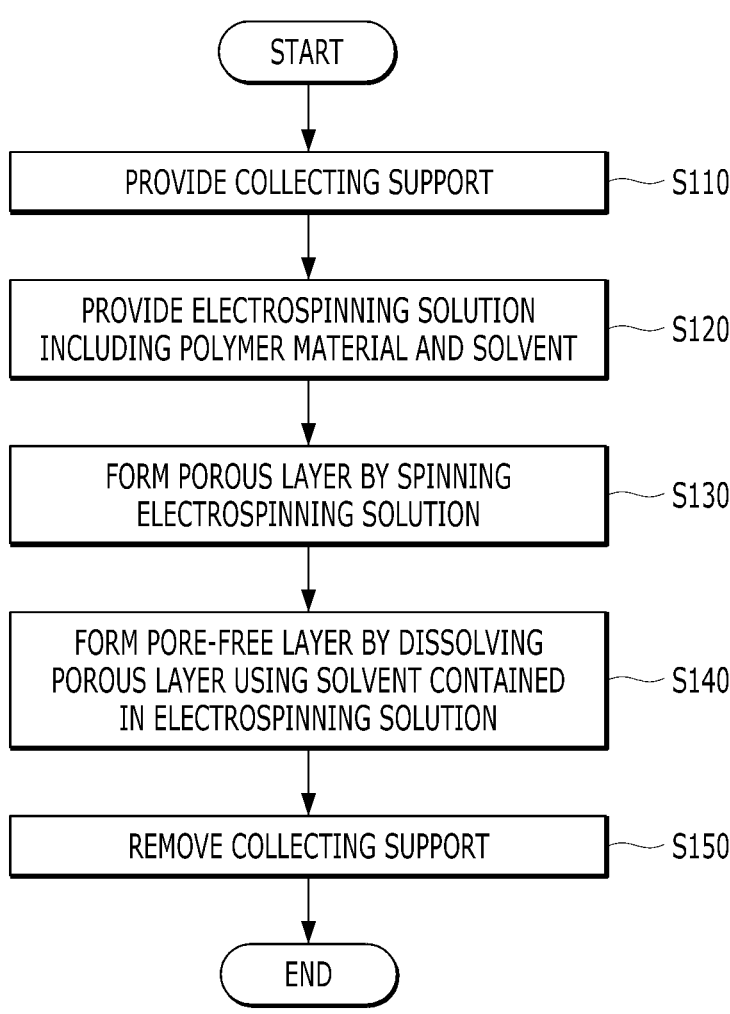
FIG. 12 is a flowchart illustrating the method of manufacturing the waterproof sound-transmitting layer according to the embodiments of the present disclosure.

FIG. 12 is a flowchart illustrating the method of manufacturing the waterproof sound-transmitting layer according to the embodiments of the present disclosure. Referring to FIG. 12, the collecting support is provided (S110). According to the embodiments, the collecting support 240 may be a base on which the waterproof sound-transmitting layer 210 is laminated and transported through the collector 320.

The electrospinning solution containing the polymer material and the solvent is provided (S120). According to the embodiments, the polymer material may include PDVF.

The electrospinning solution is electrospun to form the porous layer (S130). According to the embodiments, as the electrospinning solution is electrospun by using the spinning nozzle 310, the polymer material is laminated on the collecting support 240 in the form of fibers to form the porous layer 213.

The pore-free layer 211 is formed by dissolving a part of the porous layer 213 using the solvent (S140). According to the embodiments, the solvent spun together when the porous layer 213 is formed is collected on a lower end of the porous layer 213, that is, an upper surface of the collecting support 240, and the solvent dissolves the lower end of the porous layer 213, and thus the pores included in the porous layer 213 may be blocked. Therefore, a part of the porous layer 213 is formed as the pore-free layer 211.

After the pore-free layer 211 is formed, all the solvent remaining on the collecting support 240 is volatilized, and thus, the formation of the pore-free layer 211 is stopped, and the porous layer 213 is positioned on the upper layer, and the waterproof sound-transmitting layer 210 on which the pore-free layer 211 is positioned is formed on the lower layer.

Thereafter, the collecting support is removed (S150). According to the embodiments, after the waterproof sound-transmitting layer 210 is separated from the collecting support 240, the waterproof sound-transmitting layer 210 may be treated. The treatment is for improving the handleability of the waterproof sound-transmitting layer 210, and according to the embodiments, the waterproof sound-transmitting layer 210 is subjected to heat treatment such as thermal compression or calendaring so that fibers on the waterproof sound-transmitting layer 210 are fused. According to the embodiments, before the waterproof sound-transmitting layer 210 is subjected to heat treatment, pre-drying for evaporating the solvent remaining on the waterproof sound-transmitting layer 210 may also be performed.

Although the preferred embodiments according to the present disclosure have been described above, modifications can be made in various forms, and those skilled in the art can carry out various changed examples and modified examples without departing from the scope of the claims of the present disclosure.

INDUSTRIAL APPLICABILITY

The present disclosure relates to a waterproof sound-transmitting sheet and a method of manufacturing the waterproof sound-transmitting sheet.

The invention claimed is:

1. A waterproof sound-transmitting sheet comprising:
a waterproof sound-transmitting layer having a waterproofing function and configured to transmit a sound;
a first adhesive layer attached to a first surface of the waterproof sound-transmitting layer; and
a second adhesive layer attached to a second surface of the waterproof sound-transmitting layer, which is opposite to the first surface,
wherein the waterproof sound-transmitting layer includes:
a pore-free layer having no pores; and
a porous layer laminated on the pore-free layer and including pores,
wherein the porous layer has a web structure in which a plurality of fibers generated as an electrospinning solution containing a polymer material and a solvent is electrospun are laminated by intersecting each other, and
the pore-free layer, which is a part of the porous layer, has a form in which the plurality of fibers having the web structure are entangled with each other and pores of the porous layer are blocked as a part of the porous layer is dissolved by the solvent,
wherein the pores of the porous layer are formed by a space between fibers in the plurality of fibers,
wherein the porous layer includes:
fibers made of a polymer material; and
beads made of the polymer material and having a lump shape,
wherein the beads are formed at both ends of each of the fibers,
wherein a ratio of the fibers and the beads in the porous layer is in a range of 3:7 to 7:3, and
wherein the ratio is a ratio of areas of the fibers and areas of the beads to a total area of the porous layer or a ratio of weights of the fibers and weights of the beads to a total weight of the porous layer, and wherein the polymer material includes thermoplastic polyurethane (TPU) and polyvinylidene fluoride (PVDF), the polyvinylidene fluoride (PVDF) being present in an amount of up to 20 wt % based on a total weight of the polymer material.

2. The waterproof sound-transmitting sheet of claim 1, wherein a thickness of the pore-free layer is greater than or equal to a thickness of the porous layer.

3. The waterproof sound-transmitting sheet of claim 2, wherein a ratio of the thickness of the pore-free layer and the porous layer is 1:1 to 1:19.

\*  \*  \*  \*  \*